(12) United States Patent
Fisher et al.

(10) Patent No.: US 8,874,102 B2
(45) Date of Patent: Oct. 28, 2014

(54) CALL TRACKING SYSTEM AND METHOD

(75) Inventors: William Fisher, Rochester, NY (US); Robert Deming, Avon, NY (US)

(73) Assignee: Soleo Communications, Inc., Fairport, NY (US)

( * ) Notice: Subject to any disclaimer, the term of this patent is extended or adjusted under 35 U.S.C. 154(b) by 168 days.

(21) Appl. No.: 13/279,162

(22) Filed: Oct. 21, 2011

(65) Prior Publication Data

US 2012/0208526 A1   Aug. 16, 2012

Related U.S. Application Data

(60) Provisional application No. 61/442,423, filed on Feb. 14, 2011.

(51) Int. Cl.
*H04W 24/00* (2009.01)

(52) U.S. Cl.
USPC ........ 455/423; 455/422.1; 455/424; 455/425; 455/410; 455/414

(58) Field of Classification Search
USPC .............. 455/411, 403, 423–425, 422.1, 410, 455/414; 379/266.1, 88.17, 93.01, 201.02, 379/212.01; 705/14.23–14.54
See application file for complete search history.

(56) References Cited

U.S. PATENT DOCUMENTS

| | | | |
|---|---|---|---|
| 5,884,262 A | 3/1999 | Wise et al. | |
| 6,011,844 A | 1/2000 | Uppaluru et al. | |
| 6,349,290 B1 | 2/2002 | Horowitz et al. | |
| 6,404,884 B1 | 6/2002 | Marwell et al. | |
| 6,411,946 B1 | 6/2002 | Chaudhuri | |
| 6,487,277 B2 | 11/2002 | Beyda et al. | |
| 6,544,428 B1 | 4/2003 | Higashi | |
| 6,580,904 B2 | 6/2003 | Cox et al. | |
| 6,584,146 B2 | 6/2003 | Bose et al. | |
| 6,584,181 B1 | 6/2003 | Aktas et al. | |
| 6,600,736 B1 | 7/2003 | Bell et al. | |
| 6,625,444 B1 | 9/2003 | Fleming, III et al. | |
| 6,654,428 B1 | 11/2003 | Bose | |

(Continued)

FOREIGN PATENT DOCUMENTS

| KR | 2002027397 A | 4/2002 |
|---|---|---|
| KR | 20040026935 A | 4/2004 |
| WO | 230094 A2 | 4/2002 |

OTHER PUBLICATIONS

Peter J. danielsen, The promise of a voice-enabled web Aug. 2000, IEEE, Software Technology, p. 1 04-106.

(Continued)

*Primary Examiner* — Michael T Vu

(74) *Attorney, Agent, or Firm* — Hulsey Calhoun, PC; William N. Hulsey

(57) ABSTRACT

Methods and systems for capturing and tracking call information relating to a call from a user to a merchant are provided. According to one embodiment of the disclosed subject matter, a request for a call to a merchant from a user on a device is received and a data connection is initiated with a call analytics platform over which user information is sent from the device to the platform. A unique number allowing the device to call the platform is then passed back to the device. The device calls the platform, call context data is captured, and the call is processed to the merchant. Information relating to the user and merchant call is tracked and logged.

12 Claims, 13 Drawing Sheets

(56) References Cited

U.S. PATENT DOCUMENTS

| | | |
|---|---|---|
| 6,668,055 B2 | 12/2003 | Marwell et al. |
| 6,731,927 B1 | 5/2004 | Stern et al. |
| 6,792,082 B1 | 9/2004 | Levine |
| 6,801,763 B2 | 10/2004 | Elsey et al. |
| 6,816,578 B1 | 11/2004 | Kredo et al. |
| 6,816,727 B2 | 11/2004 | Cox et al. |
| 6,876,864 B1 | 4/2005 | Chapin |
| 6,889,354 B2 | 5/2005 | Feldman et al. |
| 6,922,411 B1 | 7/2005 | Taylor |
| 6,985,961 B1 | 1/2006 | Ramsayer et al. |
| 6,990,189 B2 | 1/2006 | Ljubicich |
| 6,990,471 B1 | 1/2006 | Rajaram |
| 6,999,563 B1 | 2/2006 | Thorpe et al. |
| 7,031,724 B2 | 4/2006 | Ross et al. |
| 7,058,164 B1 | 6/2006 | Chan et al. |
| 7,065,188 B1 | 6/2006 | Mei et al. |
| 7,092,370 B2 | 8/2006 | Jiang et al. |
| 7,092,738 B2 | 8/2006 | Creamer et al. |
| 7,099,451 B1 | 8/2006 | Jordan et al. |
| 7,103,172 B2 | 9/2006 | Brown et al. |
| 7,127,400 B2 | 10/2006 | Koch |
| 7,142,661 B2 | 11/2006 | Erhart et al. |
| 7,184,534 B2 | 2/2007 | Birch et al. |
| 7,222,301 B2 | 5/2007 | Makagon et al. |
| 7,242,752 B2 | 7/2007 | Chiu |
| 7,263,177 B1 | 8/2007 | Paterik et al. |
| 7,286,985 B2 | 10/2007 | Chiu |
| 7,330,899 B2 | 2/2008 | Wong |
| 7,515,695 B1 | 4/2009 | Chan et al. |
| 8,498,405 B2 * | 7/2013 | Siegrist ............ 379/266.1 |
| 2002/0035633 A1 | 3/2002 | Bose et al. |
| 2002/0055351 A1 | 5/2002 | Elsey et al. |
| 2002/0143548 A1 | 10/2002 | Korall |
| 2003/0005076 A1 | 1/2003 | Koch et al. |
| 2003/0032409 A1 | 2/2003 | Hutcheson et al. |
| 2003/0115288 A1 | 6/2003 | Ljubicich et al. |
| 2003/0119492 A1 | 6/2003 | Timmins et al. |
| 2003/0130864 A1 | 7/2003 | Ho et al. |
| 2003/0211845 A1 | 11/2003 | Lohtia et al. |
| 2003/0212558 A1 | 11/2003 | Matula |
| 2003/0216145 A1 | 11/2003 | Cox et al. |
| 2004/0015380 A1 | 1/2004 | Timmins |
| 2004/0023644 A1 | 2/2004 | Montemer |
| 2004/0029567 A1 | 2/2004 | Timmins et al. |
| 2004/0058710 A1 | 3/2004 | Timmins et al. |
| 2004/0120473 A1 | 6/2004 | Birch et al. |
| 2004/0132433 A1 | 7/2004 | Stern et al. |
| 2004/0156449 A1 | 8/2004 | Bose et al. |
| 2004/0156494 A1 | 8/2004 | Pines et al. |
| 2004/0166832 A1 | 8/2004 | Portman et al. |
| 2004/0198329 A1 | 10/2004 | Vasa |
| 2004/0203634 A1 | 10/2004 | Wang et al. |
| 2004/0209580 A1 | 10/2004 | Bose et al. |
| 2004/0220810 A1 | 11/2004 | Leask et al. |
| 2004/0247092 A1 | 12/2004 | Timmins et al. |
| 2004/0259535 A1 | 12/2004 | Elsey et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0003837 A1 | 1/2005 | Midkiff et al. |
| 2005/0037744 A1 | 2/2005 | Pines et al. |
| 2005/0038876 A1 | 2/2005 | Chaudhuri |
| 2005/0047560 A1 | 3/2005 | Mostad |
| 2005/0054333 A1 | 3/2005 | Johnson |
| 2005/0070260 A1 | 3/2005 | Mazzara, Jr. |
| 2005/0074112 A1 | 4/2005 | Timmins |
| 2005/0276391 A1 | 12/2005 | Ibbotson et al. |
| 2006/0117019 A1 | 6/2006 | Sylthe et al. |
| 2006/0221913 A1 | 10/2006 | Hermel et al. |
| 2006/0222019 A1 | 10/2006 | Hedin et al. |
| 2006/0222020 A1 | 10/2006 | Hedin et al. |
| 2006/0222054 A1 | 10/2006 | Conyers et al. |
| 2006/0222087 A1 | 10/2006 | Bauman et al. |
| 2006/0223468 A1 | 10/2006 | Toms et al. |
| 2006/0223514 A1 | 10/2006 | Weaver et al. |
| 2006/0223515 A1 | 10/2006 | Hermel et al. |
| 2006/0223572 A1 | 10/2006 | Hedin et al. |
| 2006/0227736 A1 | 10/2006 | Conyers et al. |
| 2006/0227737 A1 | 10/2006 | Hedin et al. |
| 2006/0227805 A1 | 10/2006 | Hedin et al. |
| 2011/0231247 A1 * | 9/2011 | Srinivasan et al. ......... 705/14.43 |
| 2011/0282739 A1 * | 11/2011 | Mashinsky et al. ........ 705/14.53 |

OTHER PUBLICATIONS

Voice XML Forum, Version 1.00, Mar. 17, 2000, Copyright 2000, pp. 1-101.

* cited by examiner

CALL TRACKING SYSTEM AND METHOD

CROSS-REFERENCE TO RELATED APPLICATIONS

This application claims the benefit of provisional patent application 61/442,423 filed on Feb. 14, 2011, which is hereby incorporated by reference in its entirety.

FIELD OF THE INVENTION

The present disclosure relates in general to the field of call tracking and analytics.

BACKGROUND OF THE INVENTION

Often, clients spending money on advertisements require call tracking and analytics services to help evaluate their return on investment. Traditionally, this type of call tracking and analytics has utilized unique telephone numbers where a different telephone number is purchased for each advertisement. However, these telephone numbers cost clients and advertisers significant monthly fees and, in order to provide sufficient granularity to track which particular advertisement resulted in a sale, hundreds or thousands of unique phone numbers are required. Often, vast numbers of unique phone numbers are required because each advertisement, on each station, in each geographic region, and in each particular time slot requires a unique phone number to effectively track the efficacy that particular advertisement had on the user (i.e. whether a user calls a merchant due to the advertisement). For example, it has been reported that one company uses over 35,000 different phone numbers to track the effectiveness of its advertising and that one of the largest call tracking companies has purchased ten times the number of new phone numbers than one of the largest phone service providers. With each phone number costing as much as $1 to $2 per number per month in addition to the costly maintenance and operational problems associated with managing a large amount of phone numbers, advertisers and call tracking companies may have substantial expenditures as a result of the need for a large number of phone numbers.

BRIEF SUMMARY OF THE INVENTION

Therefore a need has arisen for a call tracking systems and methods which do not require a large number of phone numbers and decrease the costs of cost tracking providers. In accordance with the disclosed subject matter, call tracking systems and methods are provided which substantially eliminate or reduce disadvantages associated with previously developed call tracking systems and methods.

Methods and systems for capturing and tracking call information relating to a call from a user to a merchant are provided. According to one embodiment of the disclosed subject matter, a request for a call to a merchant from a user on a device is received and a data connection is initiated with a call analytics platform over which user information is sent from the device to the platform. A unique number allowing the device to call the platform is then passed back to the device. The device calls the platform, call context data is captured, and the call is processed to the merchant. Information relating to the user and merchant call is tracked and logged.

These and other embodiments and aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTIONS OF THE DRAWINGS

The features, natures, and advantages of the disclosed subject matter may become more apparent from the detailed description set forth below when taken in conjunction with the drawings in which like reference characters identify correspondingly throughout and wherein.

Figure 8:
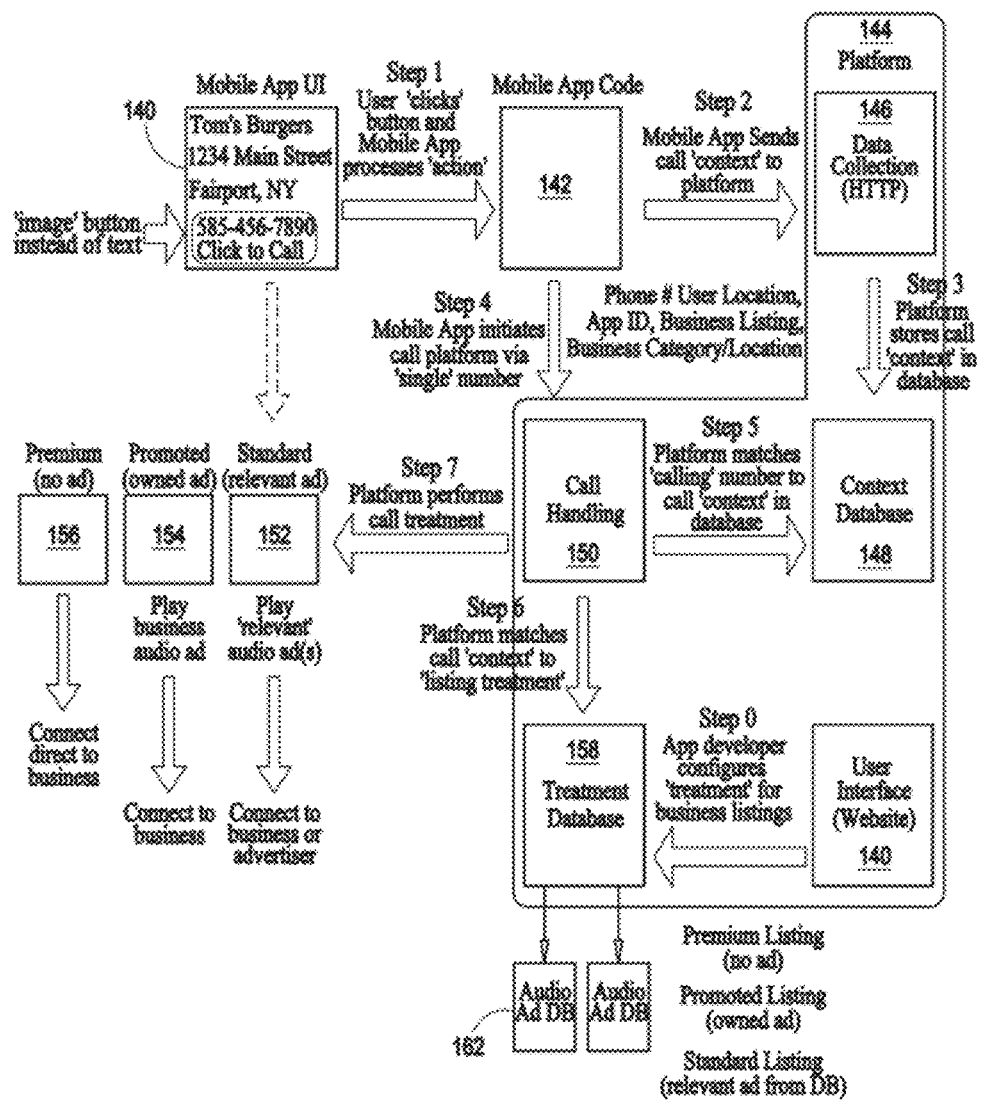

FIG. 8 is a graphic representation of an embodiment of the call tracking system architecture showing an example of the process flow of information in response to a call request; and FIGS. 9-13 are diagrams representative of mobile phone screenshots showing an example of a local mobile search publishing interface presented to a mobile device user to initiate a call request and initiate tracking In the figures, like elements should be understood to represent like elements, even though reference labels are omitted on some instances of a repeated element, for simplicity.

DETAILED DESCRIPTION OF ILLUSTRATIVE EMBODIMENTS

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings.

And although described with reference to the tracking and analytics of a call using a mobile smartphone, a person skilled in the art could apply the principles discussed herein to various devices and various forms of calling technologies including VOIP.

In the following disclosure, the terms "customer" and "advertiser" are used interchangeably to define the client responsible for presenting the image to the user on the device, such as a mobile application developer, search engine developer or local search publisher, or the merchant corresponding to the image itself. The term "merchant" is used to indicate the goods or service provider whom the user requests to contact. The term "device" is used throughout this disclosure to indicate any call enabling machine allowing a user to request a call. Thus the term device, for example, specifically includes smartphones, mobile browsers, IVR (interactive voice response units), tablets, laptops, and desktops. The term "user" is used to indicate the requestor of the information and can be a person or IVR unit (interactive voice response unit). Further, the term "advertisement" is used throughout the disclosure to indicate any call generating source, including traditional device advertisement media such as banner ads, search ads, and also search results, links, or any other image or text that a user may select to request a call.

Although discussed above with reference to an application, nearly any other mobile environment may be used to initiate the call tracking, such as: applications, browsers, phone calls, SMS (short messaging service), MMS (multi-media messaging service), cameras, IVR (interactive voice response), etc. Finally, although discussed throughout with reference to a call analytics platform, the same goals may be reached without an interception platform through the use of telecom provider information (e.g. access to the carrier's information), on-site hardware (e.g. hardware installed at the advertiser's location), or through the use of some other legal intercept platform.

The disclosed systems and methods provide for precise call tracking, logging, and monitoring without requiring thousands of unique phone numbers and associates viewership of certain content with the receipt of phone calls. A call analytics platform documents when selected or monetized content is displayed on a device and associates the viewership of that content with related phone calls from the device on which the content was displayed. A metric commonly used in advertising, this allows agencies to track the effectiveness and response to their advertisements in a mobile environment. The information gathered allows the platform to properly and securely associate advertisement viewing to a specific user. Additionally and separately the disclosed method and system retrieves phone call data. The combination of the two data sets, information related to the device and user information (device user data) and phone call data (call context data) enables the platform to associate information (such as advertisements) viewed on the device (e.g. a smart phone or pda) to calls received for a merchant from the same device. For example, a user looks at a pizza restaurant advertisement on her phone and then calls the same pizza restaurant—thus the role the advertisement played in motivating that phone call is captured by the disclosed subject matter.

In other disclosed embodiments each advertisement does not need a unique telephone number in order to track which advertisement generated the contact and/or sale. The disclosed subject matter may also allow advertisers to manage and monitor their advertising campaigns through a web interface. Another aspect allows advertisers to list the real phone number of the companies they represent instead of using fake destination numbers. And yet another aspect of the disclosed subject matter is to capture lost revenue from later placed calls, end users calling the "other" number, and manual calling, among other things.

Figure 1:
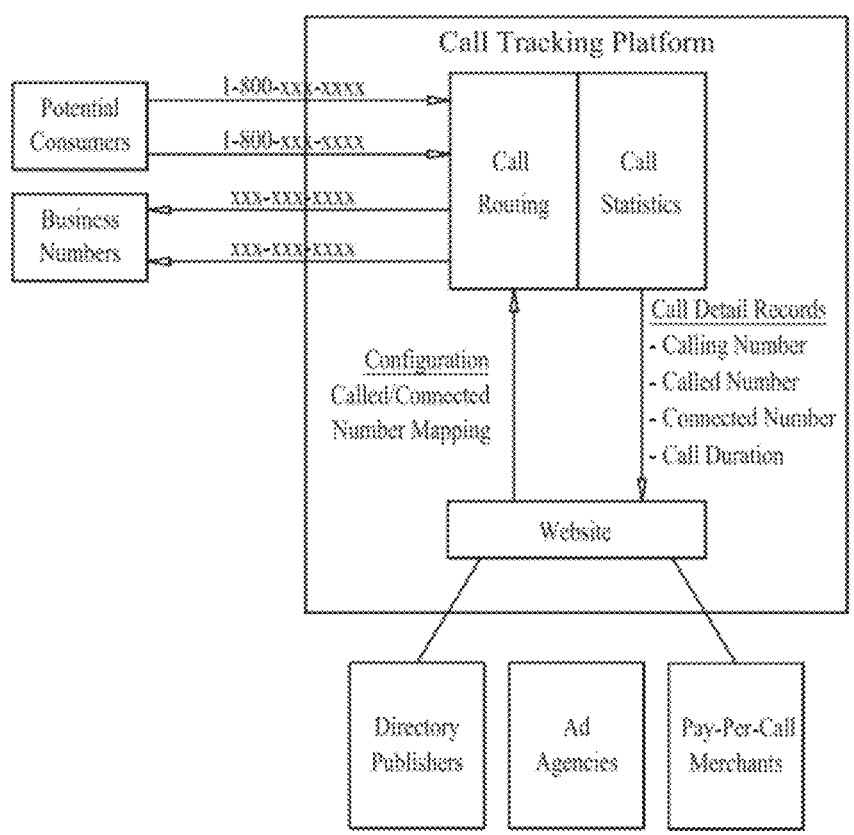
FIG. 1 (PRIOR ART) is a graphic representation of an embodiment of a current system architecture.

FIG. 1 is a graphic representation of a system architecture showing a traditional process flow for call tracking. As shown in FIG. 1, every advertisement requires a different unique telephone number. A potential consumer dials the number associated with the particular advertisement, 1-800-XXX-XXXX, and the call goes through the telephone network and travels to a call routing component. Based on the phone number that was dialed, the call routing component polls the configuration information to determine which advertisement was associated with the dialed number and which business number the call should be routed to. The call routing component also passes information to the call statistics component which logs which phone number was called, what number called the phone number, call duration, and other tracking and logging criteria for reporting and billing purposes. The call routing component then connects the call to the advertiser or merchant (shown as Business Numbers in FIG. 1) via the telephone network.

In operation, the disclosed subject matter provides for numberless call tracking and routing (meaning calls based on advertisements may be tracked without dedicated tracking numbers) which significantly reduces the amount of phone numbers required to effectively track a user's call based on an advertisement.

FIGS. 2-6 are process flows of embodiments of the disclosed subject matter depicting major steps in handling, tracking, and logging of calls generated from a call request. The steps depicted in FIGS. 2-6 are consistent unless otherwise noted.

Figure 2:
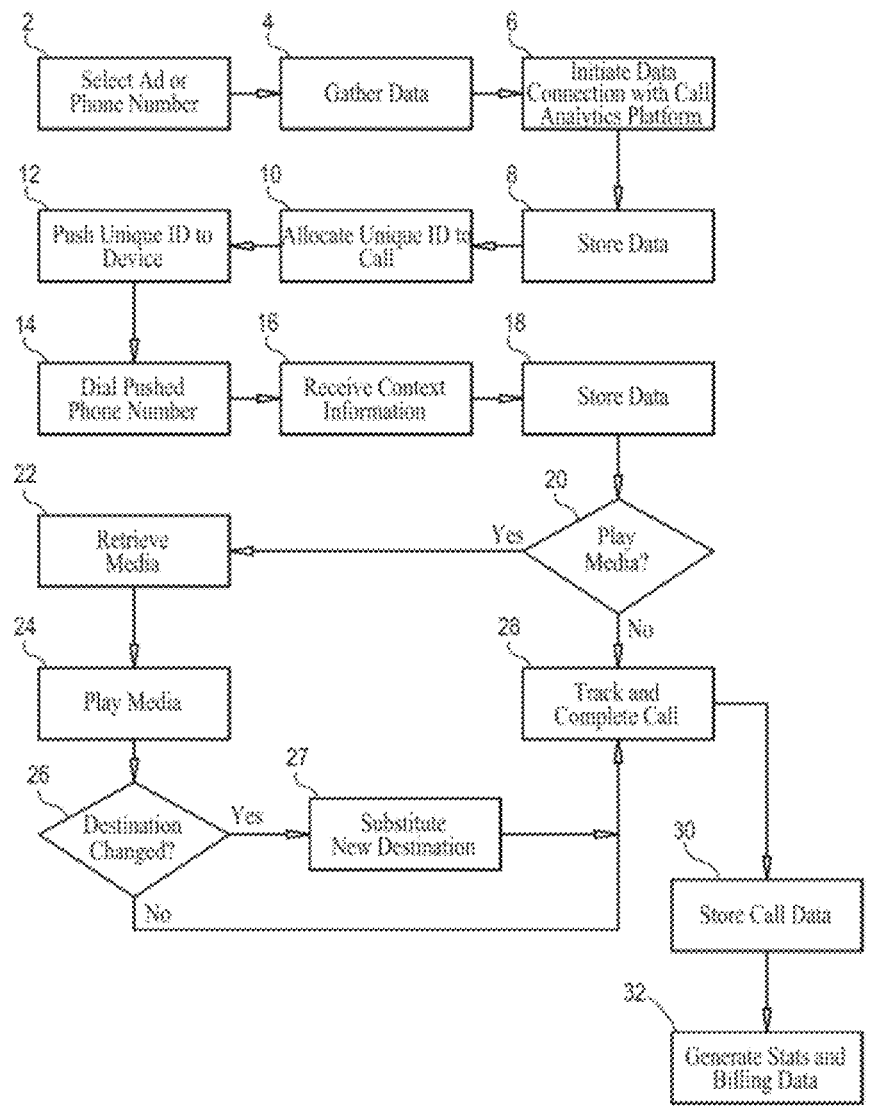
FIGS. 2-6 are process flows of embodiments of the disclosed subject matter depicting major steps in handling, tracking, and logging of calls generated from a call request.

FIG. 2 is a process flow of an embodiment of the disclosed subject matter depicting major steps in handling, tracking, and logging of calls generated from an advertisement (or any image). First, as shown in step 2, a user (for example, a user may be a person or an IVR—interactive voice response) selects an advertisement or a phone number on a device. The advertisement may, for example, come in the form of a mobile banner ad or mobile search ad displayed on a mobile phone in response to searching by the user. Next in step 4, an on-device application, which may be in the form of a mobile application or a plug-in, SDK, or API, gathers information about the device and the user generating the call. This information may include, but is not limited to, the originating phone number, time, date, GPS location, IMEI (International Mobile Equipment Identity) number, advertisement identifier, advertisement interaction (e.g. click, call, or impression), advertisement placement (e.g. application name, website, search term, application identifier), personal preferences, or previous interactions. Additionally, this information may be gathered using known methods including, but not limited to, buttons, button masking a number (displaying the phone number of a business in a graphic as opposed to text), form fields, cookies, application history search, browser transmitted information, caller information fields, application specific data, OS services, saved profiles, or IVR prompts.

Then, as shown in step 6, a data connection (which may be, for example, an HTTP POST of a XML document) is initiated between the mobile device and a call analytics platform. The customer, such as the specific mobile application developer, is identified by the call analytics platform according to the information captured by the on-device application (or application plug-in, SDK, or API) and verified to be a valid customer. The customer's specific business tracking rules and requirements are applied to the call tracking request to determine the call's eligibility for tracking. If the identified customer is eligible for tracking, the data is then stored in a database associated with the call analytics platform, step 8.

In step 10, a unique ID is allocated to the specific information request based on information such as the availability of the originating phone number (e.g. whether it is or is not an unlisted or private number), the type of device from which the request was made, OS of the device, and the availability of SIP over the mobile network. Further, the unique ID may be assigned to the specific information request using standard telephony capabilities to associate user data with a call (e.g. ISDN user data). This unique ID may be a telephone number, SIP user ID, or other mechanism used to tie the request data to the phone call. If it is a telephone number, the number may only be unique for a pre-determined timeframe (e.g. from the point of the posting of the data until the call arrives at the platform while still allowing the original user to re-dial and be connected to the correct merchant for a period of time) after which the number can be re-allocated and recycled for another call—this is called a temporary unique ID.

The unique ID is then pushed back to the device so a call may be initiated to the call analytics platform, as shown in step 12.

In step 14, the device then pushes the call to the call analytics platform using the unique ID. The call analytics platform receives the call from the device and call context information relating to the call, as shown in step 16. Call context data may include, for example, information such as the unique ID or dialed number, caller's number, etc. The context data is then stored in a database associated with the call analytics platform in step 18.

Then, in step 20, based on the device user data and the context data it is determined whether media (such as, for example, an audio advertisement, menu options, welcome greeting, or branding message) will be played to the caller before connecting the phone call to the requested merchant, or whether media will be played to the merchant with information about the caller (such as location, source of the call, requested information, etc.) before connecting the caller. If an audio advertisement is to be played, the call analytics platform determines whether the audio advertisement is an "owned" advertisement or not—an "owned" advertisement is an advertisement owned by the application which provided the original advertisement to the user which initiated the phone call. Importantly, an owned advertisement does not have to advertise the application itself or a good/service related to the requested merchant but rather may advertise any product or service. If there is no owned advertisement to play then another advertisement may be provided which could be used to promote anything including a competitor of the original advertisement that initiated the first contact.

The call analytics platform then retrieves the appropriate media, step 22, and plays it to the user, step 24. Optionally, the media may allow the user to select an alternate destination to be transferred to (such as alternate vendor, business extension, or merchant location). For example, during the advertisement the user may be prompted to press any key to be connected with the alternate vendor, shown as step 26. If the alternate vendor is chosen ("yes"), the alternate vendor's phone number is substituted as the destination number, step 27 otherwise the call is completed to the destination and tracked, step 28. The call information is maintained and stored either during the call or shortly thereafter, as shown in step 30. Additional tracking and analytic information may include, for example, the length of call, a recording or a transcription of the call, or other information.

In step 32, the analytic information which is captured and stored may then be distributed according to wide a variety of methods, including but not limited to, thick or thin clients, displayed on a web based interface, extracted and emailed to a customer, or exported to another analytic platform (e.g Salesforce, CRM, Google, etc.)

FIGS. 3-6 provide four embodiments of the disclosed subject matter depicting major steps in handling, tracking, and logging calls generated from an information request in which the steps depicted are consistent with those in FIG. 2 unless otherwise noted.

Figure 3:
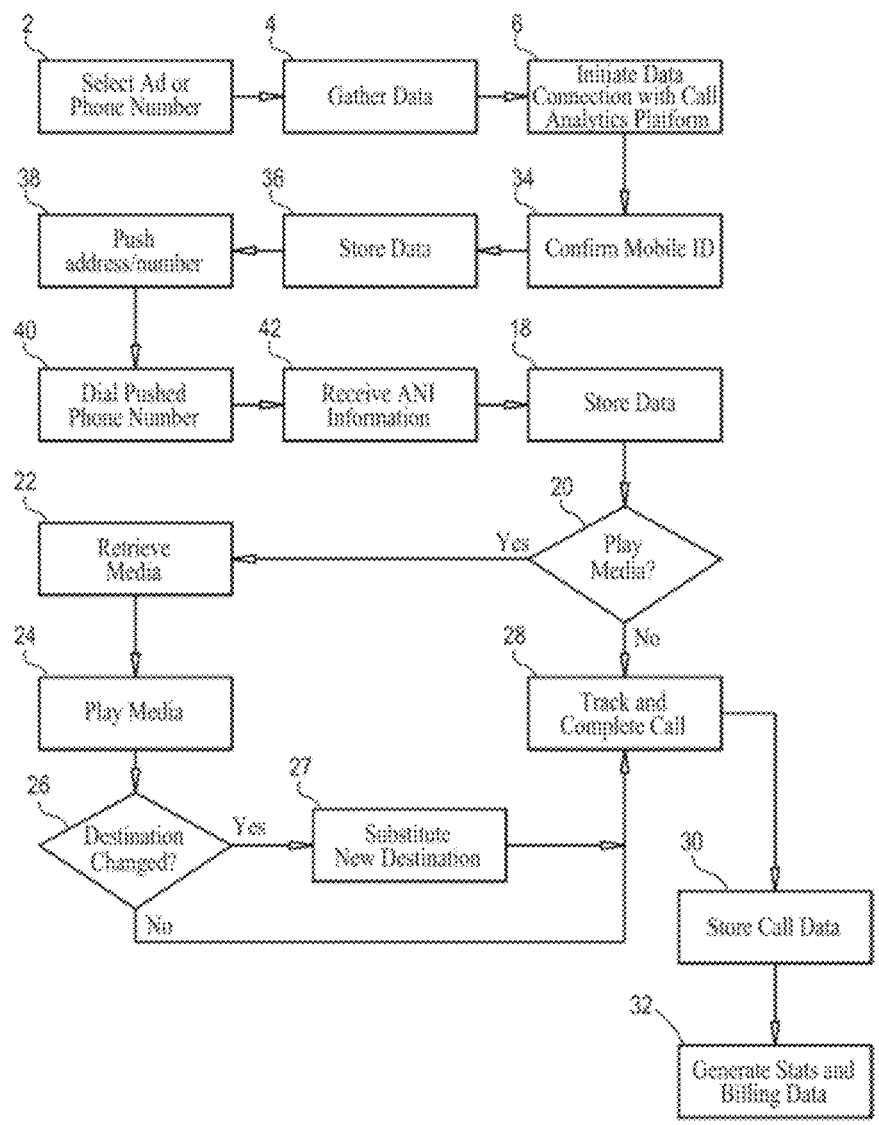

FIG. 3 is a process flow of an embodiment of the disclosed subject matter utilizing automatic number identification (ANI). An advantage of the disclosed ANI system is simplicity—when the call analytics platform receives a call it is matched to the Caller ID of the device, step 34 "Confirm Mobile ID", and the call information is stored, step 36, and sent/pushed via the internet to the device, step 38. However, a commercial disadvantage of this embodiment is that utilizing ANI has limited terms of service in certain mobile application markets and limitations with respect to caller ID blocking.

The system receives the mobile number from the data push before the call, makes the call in step 40, and then receives the ANI information on receipt of the call, step 42. By matching the mobile number and ANI information, calls may be tracked without rotating numbers at all—allowing for the use of static regional numbers and reducing load by up to 99%.

Figure 4:
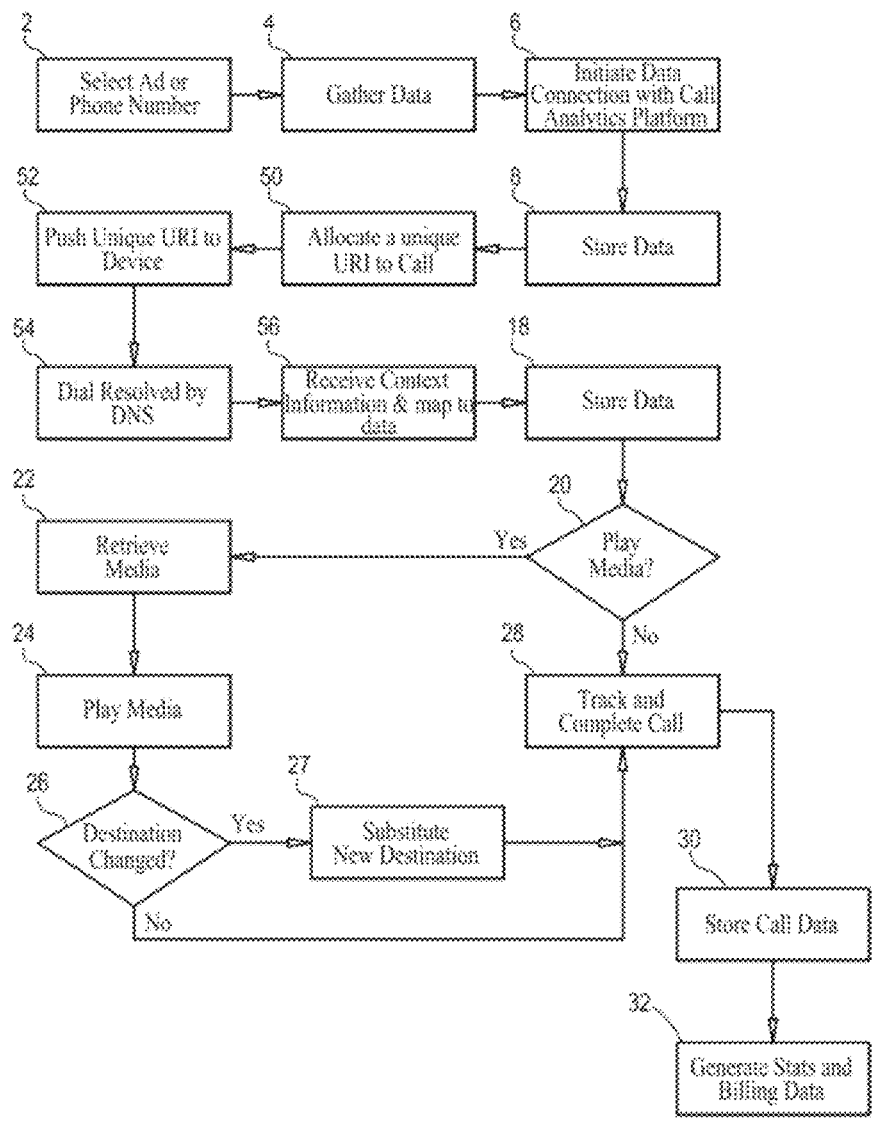

FIG. 4 is a process flow of an embodiment of the disclosed subject matter utilizing session initiation protocol (SIP). This SIP implementation embodiment varies from FIG. 2 in that each call tracking request is assigned a unique SIP URI in response to the data push/impression, step 50. The SIP URI (uniform resource identifier) is then pushed to the device, step 52, and used to initiate a SIP Session with the call analytics platform, step 54. The platform receives call context information and maps that information to the stored call data, 56 This embodiment may be significantly more cost effective but also relies on a device data connection function and high quality internet. Importantly, because URI addresses are free and unique calls may be tracked with increased granularity (a different number for every call), this method has an unmeasured increase in specificity over one number per variable chosen to track.

Alternatively, the disclosed subject matter may utilize session initiation protocol (SIP) and interactive voice response (IVR). The IVR Server/SIP implementation varies from FIG. 4 in that each information request, such as the selection of a merchant advertisement, is assigned a SIP URI address (by impression or relationship) to initiate a call after the data push. This requires another automated call handling system (e.g. 411, menus, any robot or IVR that talks to a caller) to interface with the call analytics platform. One advantage to this system is that because URI addresses are free, calls may be tracked with increased granularity by using a different number for every call, which allows for an unmeasured increase in specificity over one number per variable chosen to track—thus decreasing costs.

Figure 5:
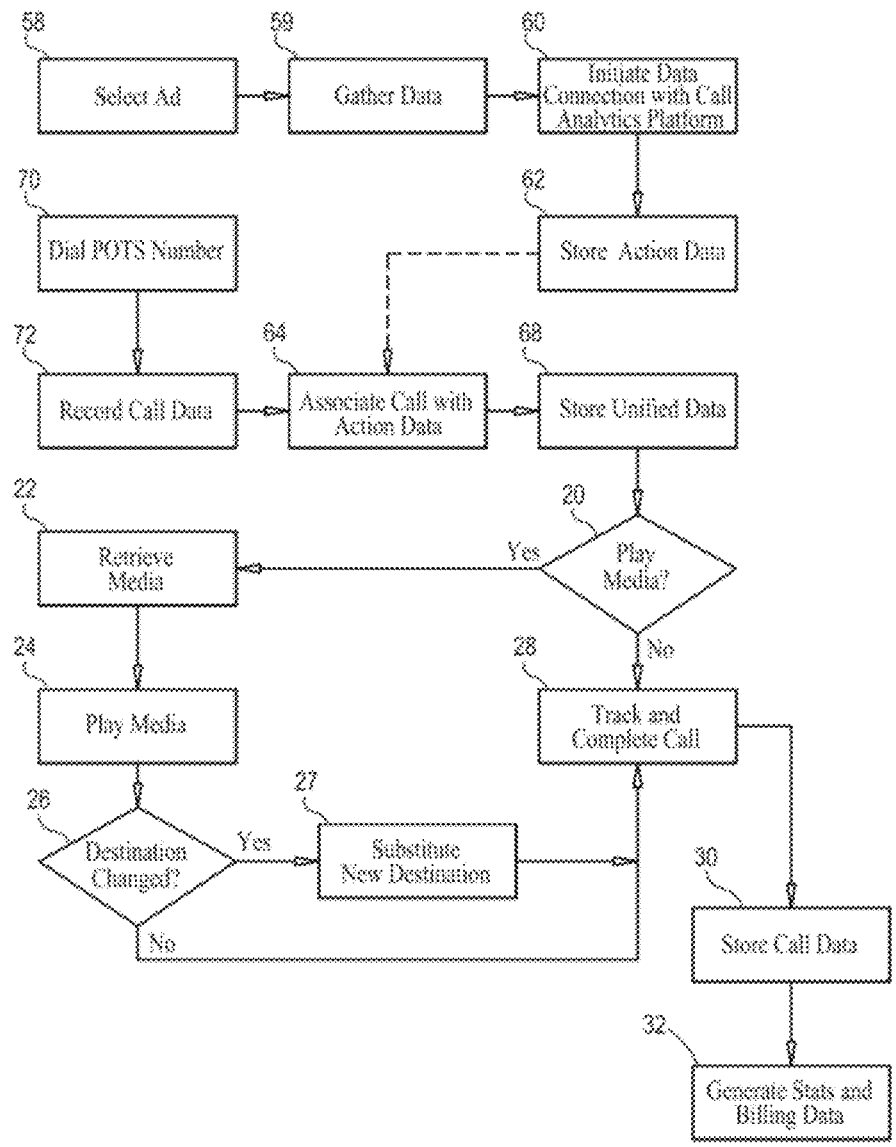

FIG. 5 is a process flow of an alternative embodiment of the disclosed subject matter. In this total tracking embodiment, a key variation from FIG. 2, 100% of the calls to a merchant (which may be a company or individual) are tracked by reassigning the destination of their published number to the call analytics platform. Thus, in operation, every call placed to the destination will be processed through the call analytics platform first, before being connected to the merchant. This allows for a direct relationship with an end business, rather than with a service provider, wherein all incoming calls are received and handled by the call analytics platform then passed on to the business.

A user may select an advertisement for the merchant on a smartphone, step 58, or call the merchant directly, step 70. In the event the merchant's plain old telephone service number is dialed, step 70 and the call is intercepted by the call analytics platform and the call data recorded, step 72. Call information is captured from a variety of sources including internet, mobile, and cellular tracking systems to identify who and why each of those calls took place. This information is recorded, step 72, and used to associate the call with action data, step 64.

In the event the user selects an advertisement for the merchant on a smartphone, step 58, action data such as user actions on a website billboard, QR code, or NFC are captured (such as through search engine analytics services), step 59, and sent to the call analytics platform, step 60, and stored, step 62. The action data is associated with call data (all the information pulled by the call analytics platform during the call, step 72), in step 64. Unified data, the combination of action data and call data, is then stored in a database associate with the call analytics platform in step 68.

Thus, the requested business may be provided with call tracking on every call (recording, quality management, customer service training) without the need for tracking numbers—providing an increase in information volume and a more holistic look at what actions generated calls.

Figure 6:
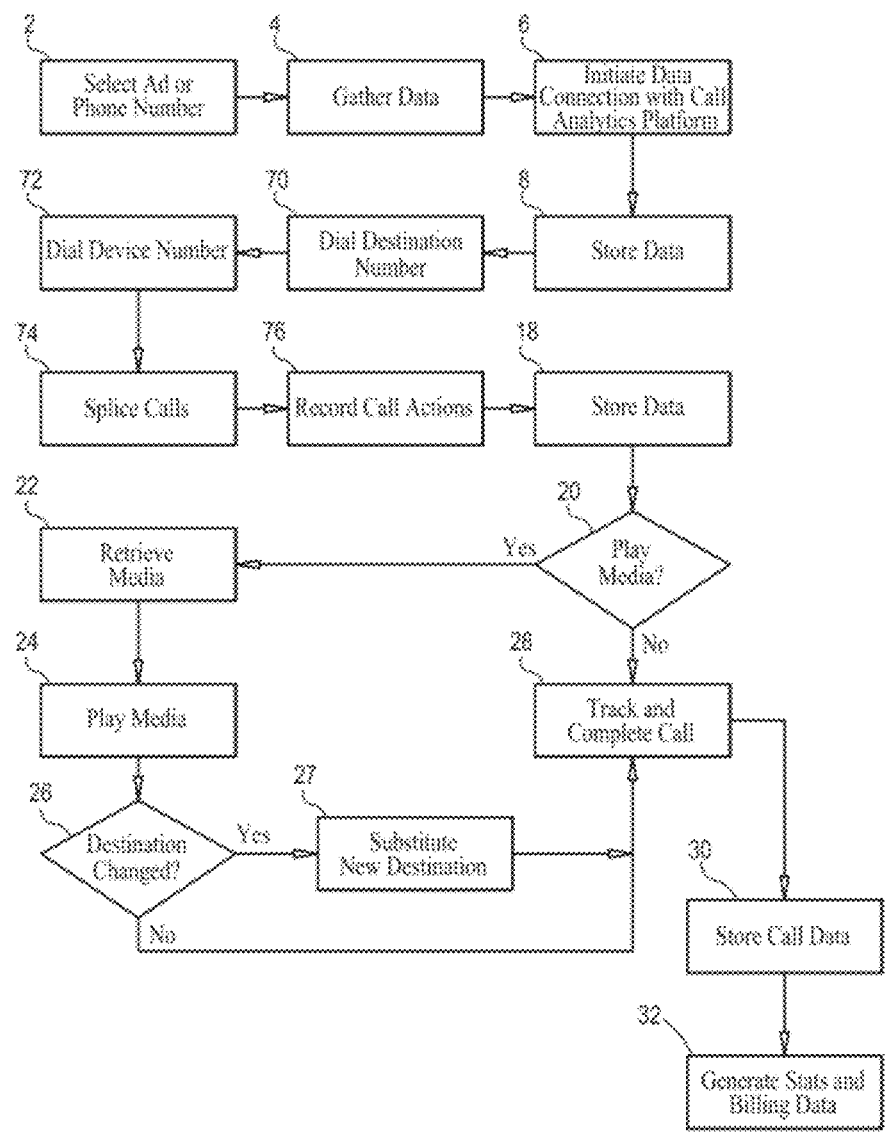

FIG. 6 is a process flow of another alternative embodiment of the disclosed subject matter. This system operates by placing two outbound calls from a central server. One call goes to the consumer, step 72, and one call goes to the merchant, step 70. An advantage of this two outbound call system is simplicity—when a call tracking request is received via the data connection of any device, the call analytics platform dials the destination number, step 70, and the device trying to reach that destination, step 72. Steps 70 and 72 are performed simultaneously—similar in operation to a conference call. The calls are spliced, step 74, and the call analytics platform records and stores the call action data, steps 76 and 18 respectively.

This system receives the mobile number and destination number from the data push before the call. By using outbound dialing, user information and call tracking data is tied together at the beginning of the call and information is not required to be associated together from different steps of the process after the call has been connected. Utilizing this embodiment, calls are tracked without rotating numbers which reduces or eliminates failures based on Caller ID blocking, redials, call history, and missing data errors. However, commercial disadvantages include the terms of service limitations between smart phone manufacturers and wireless carriers as some wireless carriers do not allow SIP over their 3G network.

Figure 7:
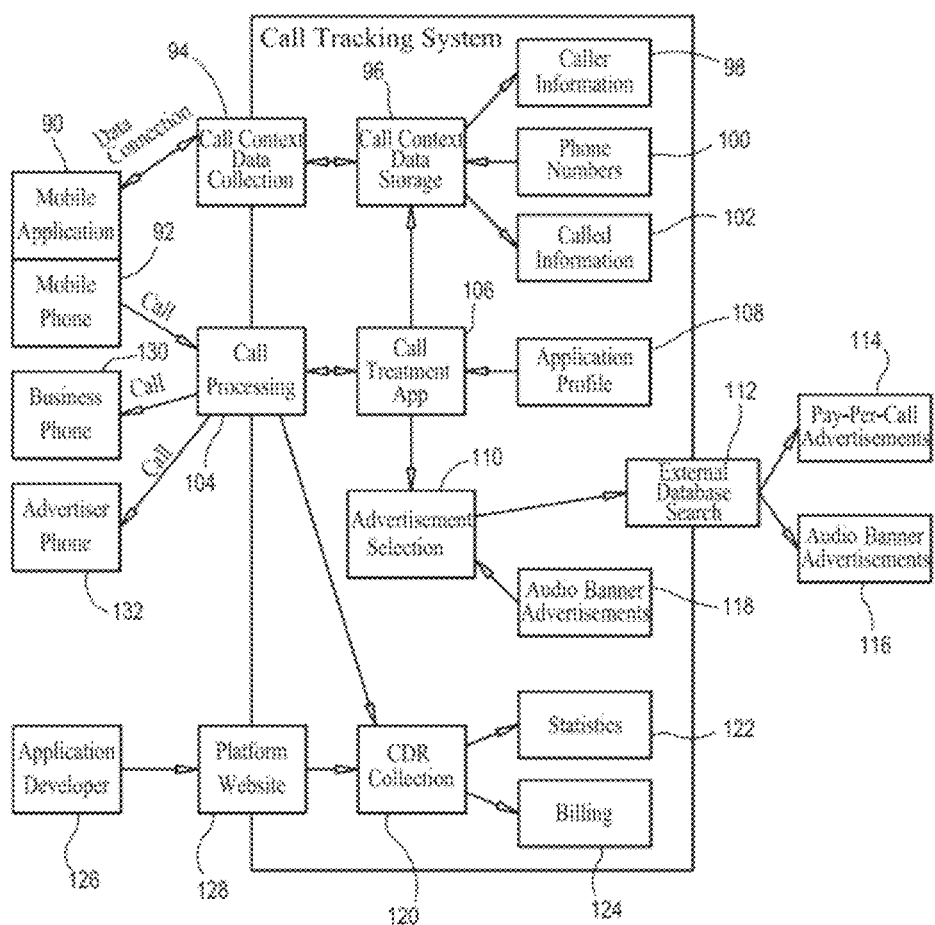
FIG. 7 is a graphic representation of an embodiment of the call tracking system architecture showing an example of the process flow of information in response to a call request.

FIG. 7 is a graphic representation of an embodiment of the call tracking system architecture showing an example of the process flow of information in response to a call request. First, mobile application 90 is installed on mobile device 92. Then the user of the mobile device is shown an image of a merchant phone number on the mobile application. When the user selects the phone number, a data connection is initiated and data is transferred over the connection and collected by call context data collection component 94, to the call tracking system. This call context data processing occurs slightly before the call to the advertiser is actually completed; however, it is all but transparent to the user. The call context data is then stored in call context data storage 96. As an illustrative example, caller information 98 and called information 102 is stored as call context data (information such as phone number of the user, phone number attempting to call, application number or ID, advertiser number or ID, time, GPS location).

A call analytics phone number, selected from phone numbers 100, is then transferred back to mobile phone 92 and mobile phone 92 dials the call analytics phone number. The call is then routed to call processing area 104 which polls call treatment application 106 to determine how to treat the call. Importantly, the call processing and routing may utilize PSTN, SIP, or other known audio processing.

Application profile system 108 feeds information to call treatment application 106 so call treatment application 106 can determine how to handle the current call. In one embodiment, application profile system 108 is a database connected to a user web interface where advertising agencies or independent advertising clients may monitor and configure their advertising campaigns. If call treatment application 106 determines no intermediate audio advertisement (e.g. audio banner) is to be played, call processing system 104 connects mobile phone 92 to the advertising business phone number—business phone 130. However, if call treatment application 106 determines an intermediate audio advertisement (e.g. an audio banner advertisement) is appropriate, advertisement selection system 110 is polled to provide the intermediate audio advertisement. This intermediate audio advertisement may be pulled from an internal database, shown as internal audio banner advertisements 118, or external database of advertisements using external database search component 112. In one embodiment, the external database is comprised of audio advertisements provided by the application manufacturer, such as pay-per-call advertisements 114 and audio banner advertisements 116, and internal audio banner advertisements 118 are provided when the external database does not have an appropriate intermediate audio advertisement—for example if the end user has selected an advertisement for a local pizza company; the external database is searched, but has no intermediate audio advertisement relating to pizza companies; the internal database is polled to find a pizza company audio banner to play.

The intermediate audio advertisement is then played to the user. Depending on the user's actions (e.g. did the user indicate a desire to connect to the intermediate audio advertiser) the call is connected either to the original requested merchant's, business phone 130 or the intermediate audio advertiser's business phone number, advertiser phone 132.

As the call proceeds, additional information is gathered and passed to call detail record collection system 120 which tracks statistics 122 (e.g. number of times the advertiser's business phone was called; length of call; number of times this particular mobile device has called; which application delivered the user; which advertisement in the application generated the contact; how long the call lasted; record the call for later transcription, to monitor if a sale resulted, or for other purposes; etc.). Call detail record collection system 120 transfers information to billing component 124 to properly invoice the client for the service.

In one embodiment, there is also provided application developer interface 126 via platform website 128 which allows developers to monitor the statistics and billing for their application, advertisements, and clients.

FIG. 8 is a graphic representation of an embodiment of the call tracking system architecture showing an example of the process flow of information in response to a call request. From the user's viewpoint, there is only one continuous uninterrupted call, however the outbound calls depicted in FIG. 8 are performed at substantially the same time. In this embodiment, the mobile application provides an advertisement to a user. The phone number of the business is displayed to the user on mobile device 140; however, the phone number is an image button instead of text. The image is used to keep the device's operating system from detecting the number and usurping the application's tracking component by dialing the number. When the user clicks the phone number to call the advertising business, mobile application code 142 on the device gathers and transfers data (e.g. phone number of mobile device, IMEI of mobile device, IP address of mobile device, phone number of advertising business, advertisement ID, application ID, etc.) via an HTTP data connection to the data collection component 146 on calling platform 144. Data collection component 146 stores the data in context database 148.

Mobile application 142 then connects the mobile device to call handling component 150. Mobile application 142 accomplishes this by dialing a call analytics phone number instead of the advertiser's business phone number. Additional context information is gathered, stored, and used to match the incoming phone call with a previous data connection. Additional unique identifier information may also be transferred during the data connection or at another time. Additional unique identifier information may include, for example, a device thumbprint, MEID (Mobile Equipment Identifier) number, IMSI (International Mobile Subscriber Identity) number, or the mobile device's model number.

Call handling component 150 then polls treatment database 158 for an intermediate audio advertisement and if one is available, pulls the intermediate audio advertisement from the audio database (such as Audio Ad DB 162 as shown in FIG. 8). The intermediate audio advertisement selected (e.g. audio banner) is then played to the caller. Importantly, the call processing and call routing may utilize PSTN, SIP, or other known audio processing.

In this embodiment, user interface 140 is provided to the advertiser to configure intermediate audio advertisements including uploading the advertisement and configuring when the audio advertisement should play. This may also include an auction style system such that the highest bidder's advertisement plays.

As shown in FIG. 8, there are three possible outcomes when polling the treatment database: retrieve and play a standard audio banner 152; retrieve and play a promoted audio banner 154; or connect directly to the original advertiser's business phone number 156. A promoted audio banner is one provided by the application developer and may be pulled from the application developer's audio banner database. A standard audio banner is one pulled from the internal database of advertisements. Having two such databases of audio banners allows an advertisement to be pulled from the internal database to "fill in" the gaps in the application developer's database in the cases where the application developer does not have a relevant advertisement.

Figure 9:
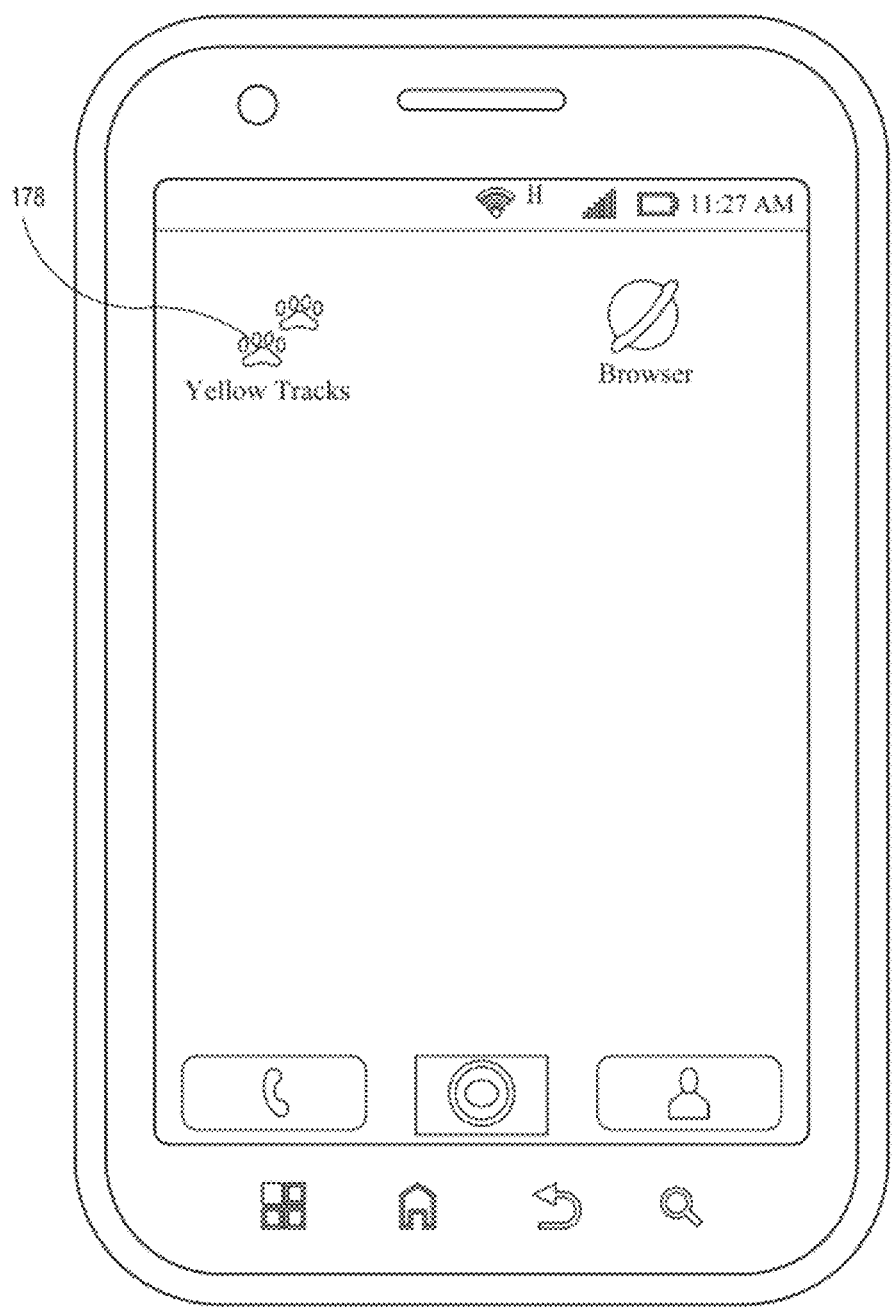

FIGS. 9-13 are diagrams representative of mobile phone screenshots showing an example of local mobile search publishing interfaces presented to a mobile device user to initiate a call request in accordance with the disclosed subject matter—thus FIGS. 9-13 show an example of a mobile application product utilizing the disclosed systems and methods. FIG. 9 is an initial device interface allowing the user to initiate mobile application Yellow Tracks 178.

Figure 10:
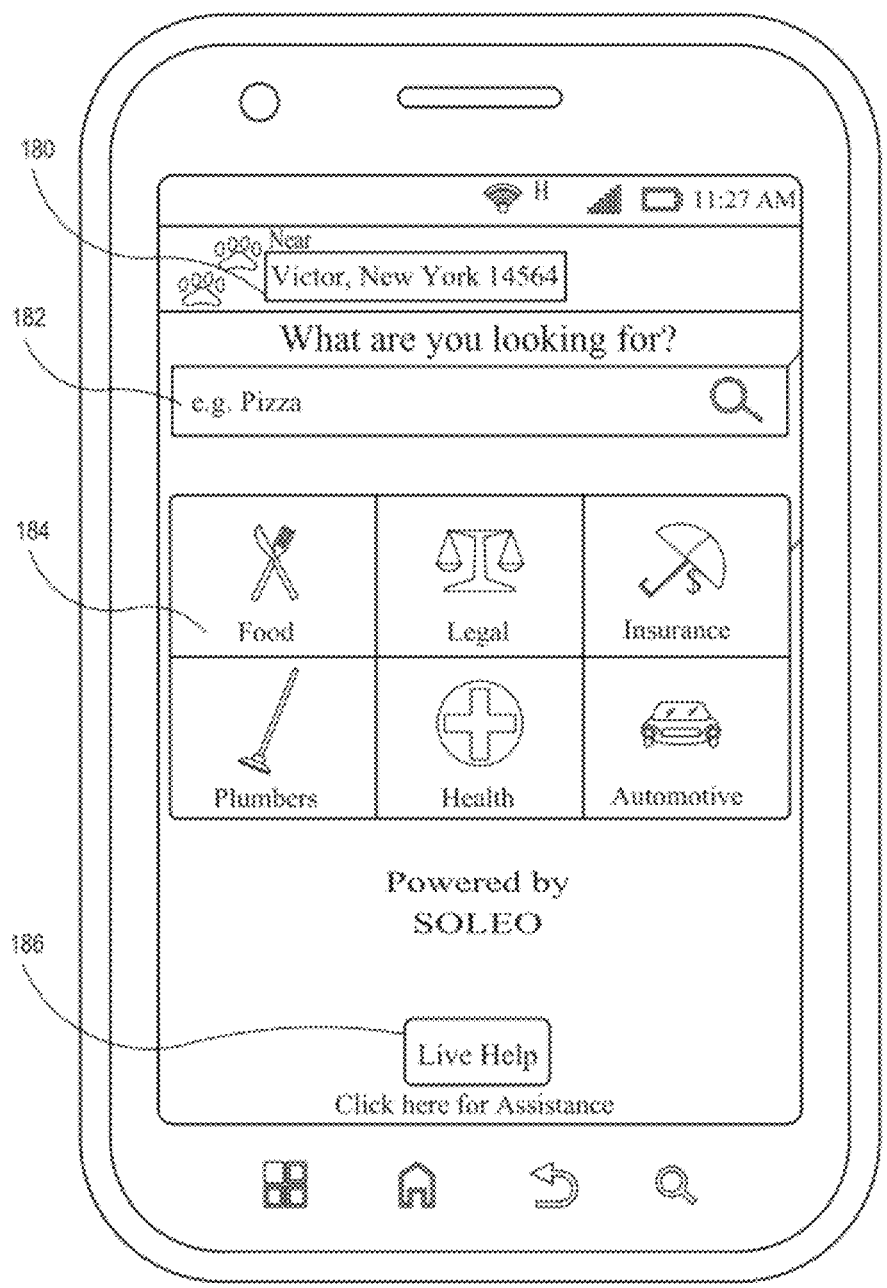

In FIG. 10, the user has opened the mobile search application and the application has automatically detected the device's location, "Victor, N.Y." Button 180 may also be selected to change or update the location. A user may search for business listings according to location, business category, business name, or other common search identifiers. Search field 182 allows a user to search for a specific listing or a general category. Clickable categories 184 allows a user to quickly and easily select commonly used search categories for local businesses. Selecting help button 186 initiates a live directory help session.

Figure 11:
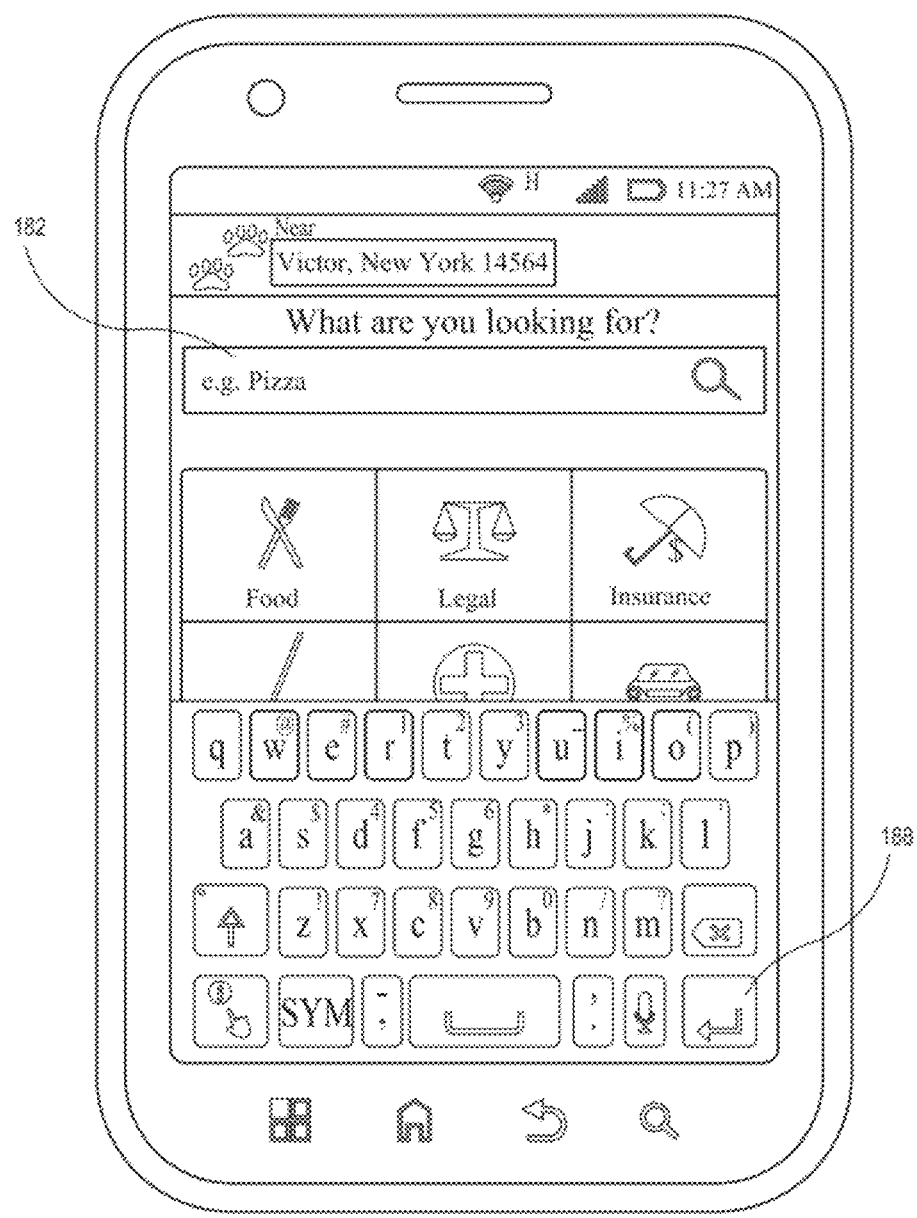
Figure 12:
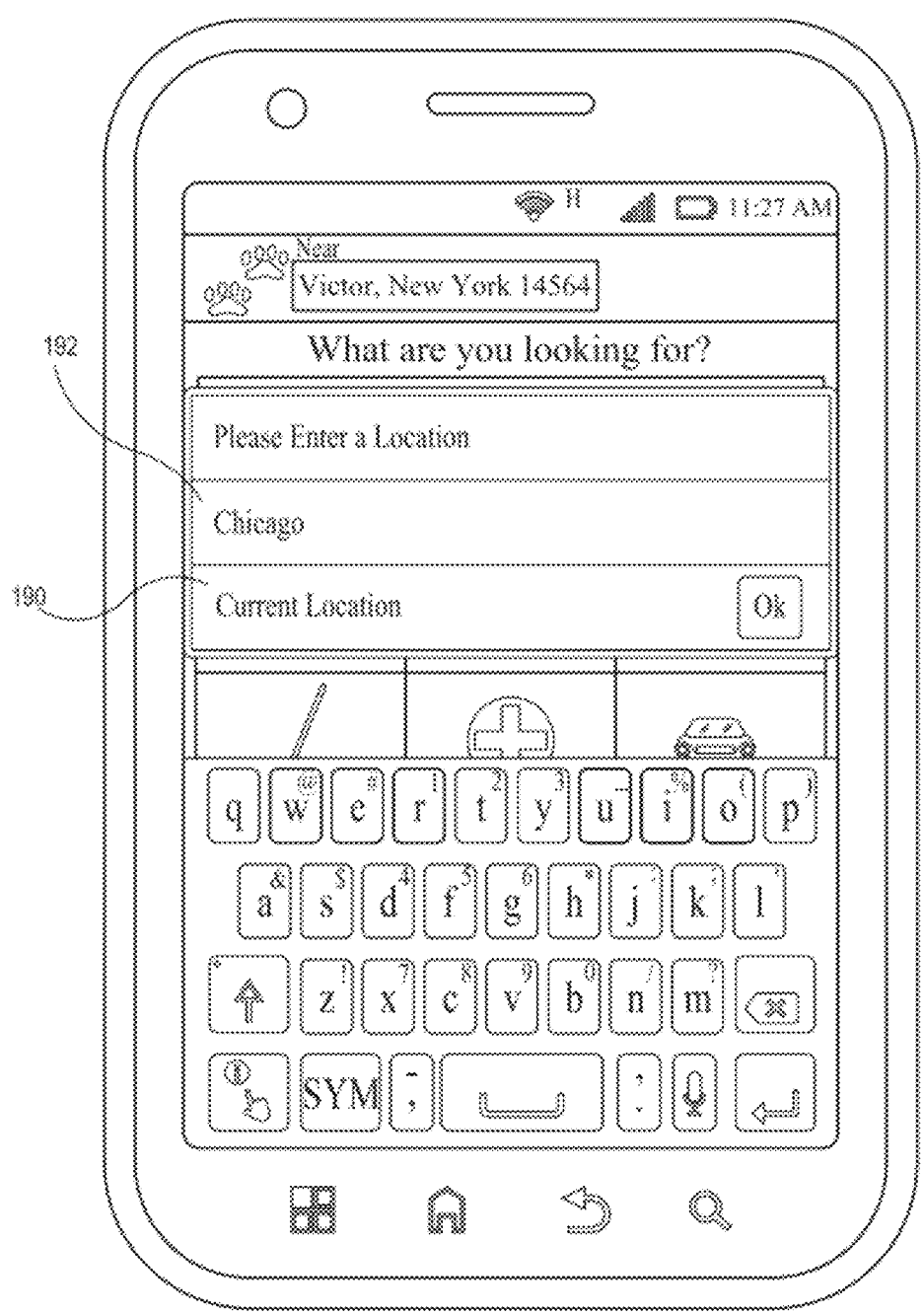

FIG. 11 shows the same initial search screen after the user has manually entered a search term in search field 182 and now may start the search by pressing enter 188 on the touch key pad. FIG. 12 allows the user to search for a listing in a different city. The user may press current location button 190 to update the GPS finder to the device's current location or enter the location/city the user would like to search for a listing in location field 192.

Figure 13:
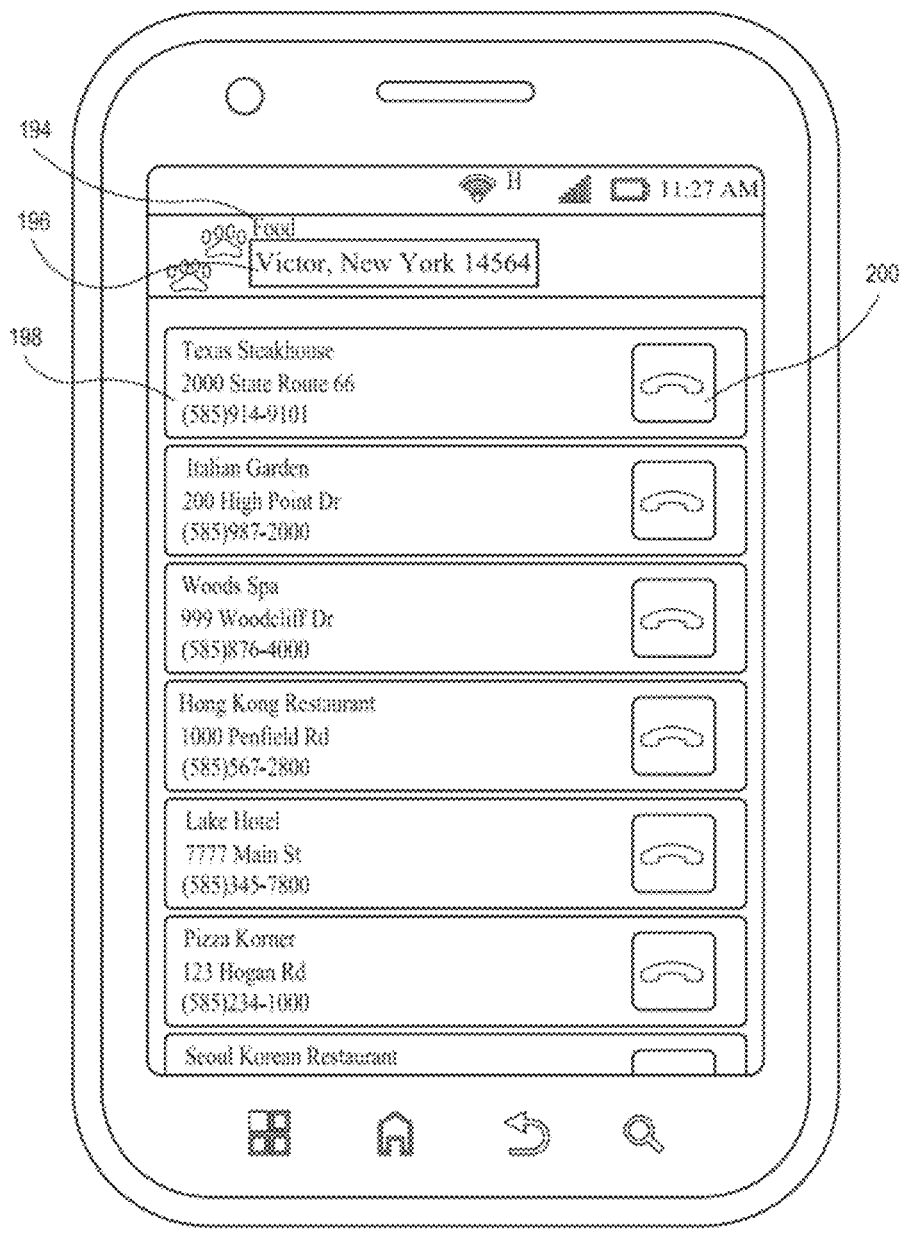

FIG. 13 is a result screen showing presenting the results from the users search. As shown, the user has searched for "Food" 194 in "Victor, N.Y." 196. The search results, such as search result 198, are presented with calling buttons, such as calling button 200, which allow the user to call the corresponding business listing by clicking on the calling button. Thus, the user is able to effectively search and contact business listings. Selecting a calling button is an example of a user initiating a calling request for a merchant, step 2 in FIG. 2. Alternatively, the interface may display the actual number listings as an image or the user may call a business listing by saying the business name. In operation, from the user's viewpoint after a calling button is selected the user is seamlessly connected to the requested merchant during which corresponding media may be played, step 20 in FIG. 2.

In operation, the disclosed subject matter provides a call tracking and logging system whereby a user selects an advertisement or listing on a mobile device. Data is gathered about the device and the advertisement, transmitted to an call analytics platform via a data connection, and stored on the platform. If the mobile device's phone number is unavailable, the system pushes a unique ID to the device; otherwise, the standard call analytics phone number is provided. The device dials the call analytics phone number but lists the advertiser's phone number in the call history. Upon connection to the call analytics platform, additional context information is stored. Based on the information/data received, the system determines whether to play an audio banner advertisement. If played, the caller is provided the option of being connected with the alternate vendor. After the call is connected, the call is monitored for duration and other statistics and/or recorded for transcription or other purposes.

The foregoing description of the exemplary embodiments is provided to enable any person having skill in the art to make or use the claimed subject matter. Although example diagrams to implement the elements of the disclosed subject matter have been provided, one skilled in the art, using this disclosure, could develop additional hardware and/or software to practice the disclosed subject matter and each is intended to be included herein. In addition to the above described embodiments, those skilled in the art will appreciate that this disclosure has application in a variety of arts and situations and this disclosure is intended to include the same. It is intended that all such additional systems, methods, features, and advantages that are included within this description be within the scope of the claims.

What is claimed is:

1. A method for capturing and tracking call information, the method comprising:
   receiving a request for a call to a merchant from a user on a device, wherein said request for said call to said merchant is received in response to a selection of an image relating to said merchant on said device, said selection of an image presented as a banner ad resulting from a local listing search;
   capturing device user data relating to said device requesting said call;
   initiating a data connection between said device and a call analytics platform;
   sending said device user data to said call analytics platform, said call analytics platform performing the following steps:
   identifying a customer number associated with said request and based on said device user data;
   allocating a unique ID to said customer number, said unique ID enabling said device to make a call to said call analytics platform; and
   sending said unique ID to said device via said data connection between said device and said call analytics platform;
   calling said unique ID from said device;
   capturing call context data relating to said call from said device;
   connecting said device to said merchant; and tracking and logging information relating said call between said device and said merchant.

2. The method of claim 1, wherein said unique ID is an ANI matched to the caller ID of the device.

3. The method of claim 1, wherein said unique ID is an element that is a part of a SIP URI.

4. The method of claim 1, wherein said unique ID is assigned using standard telephony capabilities to associate said device user data with said call request.

5. The method of claim 1, wherein said unique ID is assigned using a temporary number.

6. The method of claim 1, further comprising the step of playing audio media to said user based on said captured device data and said captured context data before connecting said device to said merchant.

7. The method of claim 1, wherein said device is a mobile device.

8. A system for capturing and tracking call information, comprising:
- a mobile device receiving a request for a call to a merchant from a user on a device in response to a selection relating to said merchant on said device, capturing device user data relating to said device requesting said call, initiating a data connection between said device and a call analytics platform, and sending said device user data to said call analytics platform;
- said call analytics platform storing said user data in a database, identifying a customer number associated with said request from said database, said call analytics platform allocating a unique ID to said customer number based on said device user data, said unique ID enabling said device to make a call to said call analytics platform, said call analytics platform sending said unique ID to said device via said data connection between said device and said call analytics platform;
- wherein said mobile device calls said unique ID from said device, said call analytics platform captures call context data relating to said call from said device and connects said device to said merchant, and said call analytics platform tracks and logs information relating said call between said device and said merchant.

9. The system of claim 8, wherein said call analytics platform plays audio media to said user based on said captured device data and said captured context data before connecting said device to said merchant.

10. The system of claim 8, wherein said device is a mobile device.

11. The system of claim 8, wherein said unique ID is an ANI matched to the caller ID of the device.

12. The system of claim 8, wherein said unique ID is an element that is a part of a SIP URI.

* * * * *